(12) United States Patent
Shmunk et al.

(10) Patent No.: US 8,699,814 B2
(45) Date of Patent: Apr. 15, 2014

(54) METHOD FOR IMPROVING IMAGES

(76) Inventors: Dmitry Valerievich Shmunk, Novosibirsk (RU); Eugene Alexandrovich Panich, Novosibirsk (RU)

(*) Notice: Subject to any disclaimer, the term of this patent is extended or adjusted under 35 U.S.C. 154(b) by 260 days.

(21) Appl. No.: 13/384,571

(22) PCT Filed: Mar. 19, 2010

(86) PCT No.: PCT/RU2010/000119
§ 371 (c)(1),
(2), (4) Date: Jan. 17, 2012

(87) PCT Pub. No.: WO2011/010949
PCT Pub. Date: Jan. 27, 2011

(65) Prior Publication Data
US 2012/0114264 A1    May 10, 2012

(30) Foreign Application Priority Data
Jul. 20, 2009 (RU) ................ 2009127932

(51) Int. Cl.
*G06K 9/40* (2006.01)
(52) U.S. Cl.
USPC ........... 382/263; 382/260; 382/274; 382/275; 358/3.26; 358/3.27; 358/463
(58) Field of Classification Search
USPC ......... 382/260, 263, 264, 274, 275; 358/3.26, 358/3.27, 463
See application file for complete search history.

(56) References Cited

U.S. PATENT DOCUMENTS

| | | | |
|---|---|---|---|
| 5,579,430 A * | 11/1996 | Grill et al. ............... | 704/203 |
| 5,828,793 A | 10/1998 | Mann | |
| 6,330,302 B1 * | 12/2001 | Joosten ............... | 378/98.12 |
| 8,130,278 B2 * | 3/2012 | Border et al. ............ | 348/208.6 |
| 8,339,508 B2 * | 12/2012 | Levy ....................... | 348/370 |
| 8,532,504 B2 * | 9/2013 | Wagner et al. ............ | 398/208 |
| 2005/0013501 A1 | 1/2005 | Kang et al. | |

OTHER PUBLICATIONS

International Search Report for PCT/RU2010/000119, English translation attached to original, Both Completed on Aug. 2, 2010, All together 3 Pages.
Website: "Design Flexibility for Mobile Applications", http://www.aptina.com/assets/downloadDocument.do?id=373, Retrieved on Feb. 23, 2012, All together 3 Pages.
Mertens et al. "Exposure Fusion", Proceedings of Pacific Graphics 2007, 9 Pages.

(Continued)

*Primary Examiner* — Yosef Kassa
(74) *Attorney, Agent, or Firm* — Brooks Kushman P.C.

(57) ABSTRACT

A method for producing high-quality photographic images in low-light conditions and in the absence of large-aperture optics. The method includes, upon photographing, first obtaining a plurality of frames of the image with exposures which either partially overlap in time or with an insignificant pause between them. The best result can be obtained in the case when the pause between the exposures represents less than 1/20 of the overall exposure time. The method further includes separating out the initial images from a group of exposures and filtering the images having the smallest exposure interval using the images having the largest exposure interval. The final image is obtained by combining initial images having different exposure intervals from the same group.

3 Claims, 6 Drawing Sheets

Decomposition of an image in the process of image filtering into small overlapping areas of equal size (tiles)

(56) References Cited

OTHER PUBLICATIONS

Website: "CMOS image sensors—always at the center of every smart design", http://www.aptina.com/products/image_sensors/, Retrieved from the WayBackMachine on Feb. 23, 2012, All together 3 Pages.

Weston. "Digital Exposure and HDR Imaging", Originally published in hardback in 2008, Section 1: HDR imaging and the new theory of exposure, "The added Flexibility of Digital ISO", p. 18-20.

Weston. "Digital Exposure and HDR Imaging", Originally published in hardback in 2008, Section 3: In-camera exposure, Exposure techniques for complex lighting scenarios, "Photographing in low light", "Overcoming digital noise in-camera", p. 96-97.

* cited by examiner

Data readout mode when there is non-destructive access to the sensor pixels.

Data readout mode with intermediate reset of the sensor.

Standard data readout mode.

Decomposition of an image in the process of image filtering into small overlapping areas of equal size
(tiles)

Options of coefficients decomposition for the two-dimensional frequency transform into non-overlapping areas.

METHOD FOR IMPROVING IMAGES

CROSS-REFERENCE TO RELATED APPLICATION

This application is the U.S. national phase of PCT Appln. No. PCT/RU2010/000119 filed Mar. 19, 2010 which claims priority to Russian application 2009127932 filed Jul. 20, 2009, the disclosures of which are incorporated in their entirety by reference herein.

AREA OF TECHNOLOGY

This invention deals with photographic images, in particular, taking pictures with the help of sensors and an electronic shutter. It can be used for taking pictures in low light conditions and when there is no high-aperture optics.

BACKGROUND OF THE INVENTION

Today there is a wide diversity of small-size mobile photo devices which are either detachable or built into other appliances such as cellular telephones which allow for taking pictures of various objects. High-aperture optics for low light conditions cannot be used in such devices because of the strict size and weight limitations.

There are two well known ways of obtaining pictures in low light conditions when high-aperture optics are not applied. They can be used either separately or in combination:

1. Longer exposure time, sometimes, when necessary, in combination with optical or digital image stabilizers ('Exposure in digital photography,' Chris Weston. ISBN 978-5-9794-0235-2, 978-2-940378-29-6).

This method has a weakness: in case of long exposure and when picture is taken with a hand-held camera which is not anchored solidly during the exposure, the resulting image is blurry, fuzzy and not sharp. Using additional mechanical devices (such as a tripod) does not meet mobility requirements. This weakness is partially compensated with a digital or optical image stabilizer. However, such devices make cameras larger. In addition, the weakness of the first method, which cannot be eliminated by the use of image stabilizers, is the fact that moving objects in the scene appear blurred.

2. Intensive amplification in the data reading path from the sensor (equivalent to increased sensitivity value) ('Exposure in digital photography,' Chris Weston. ISBN 978-5-9794-0235-2, 978-2-940378-29-6).

The weakness of the second method is in amplification of not only brightness of an image, but also noise from the sensor and image reading/digitalization path. There are methods to suppress noise afterwards, however, they inevitably make certain details in the image disappear, too.

There are descriptions of a procedure for receiving several (a series of) exposures from the sensor comprising the following stages (http://www.aptina.com/products/image_sensors/—data table for contemporary sensors; http://www.aptina.com/assets/downloadDocument.do?id=373—detailed description of a sensor with an electronic shutter: mt9p013):
  determination of optimal exposure time,
  exposure during time T1 and following data readout,
  interval between exposures,
  exposure during time T2 and following data readout,
  interval between exposures,
  exposure during time T3 and following data readout,
  and so on.

The weakness of the above picture taking method is in exposures being scattered over time, which worsens the quality of display of moving objects after exposures are fused.

The method of image enhancement described in U.S. Pat. No. 450,346 is closest to proposed invention. This method suggests that two frames are used as input images and one of these images has an improved signal/noise ratio, however, with certain distortions. The method uses low-frequency data from the first image and high-frequency data from the second one. Additional logic is used to determine the threshold frequency for the two images. The frequency can change adaptively over the image region depending on the image characteristics. This method is used in the following way to reduce spurious signals in an image:
  several exposures of an object are obtained;
  the first exposure is taken (with a low signal/noise ratio);
  several images with a high signal/noise ratio are fused into a single image producing the second image;
  low-frequency filtering is used on the first image to reduce noise;
  the second image undergoes high-frequency filtering;
  frequencies of low and high-frequency filtering are adjusted to the extent of local distortions (artifacts);
  the filtered images are combined by simple summation.

The weakness of this method is blurriness in the image which cannot be eliminated. If there are moving objects in the scene, images taken by this method with exposures separated in time will inevitably contain artifacts.

SUMMARY OF THE INVENTION

The goal of the invention is to obtain high-quality images with mobile photo devices without use of high-aperture optics or any other additional devices.

The solution to the task is as follows:
  Several exposures are received with a low signal/noise ratio.
  Out of those exposures, original images with the best sharpness are identified from consecutive groups of exposures which either partially overlap in time or have intervals between them not exceeding $\frac{1}{20}$ of the total time of exposure.
  Images with shorter exposure times are filtered out using images with longer exposure times.
  The final image is obtained by fusing original images from the same group with different exposure times.

DETAILED DESCRIPTION OF THE INVENTION

The proposed method of enhancing photo images consists of two stages:

1 Special image data collection mode (readout) from the sensor producing several frames of the image.
2 Fusion of the images obtained into one final image.

Stage One

Method 1.

Figure 1:
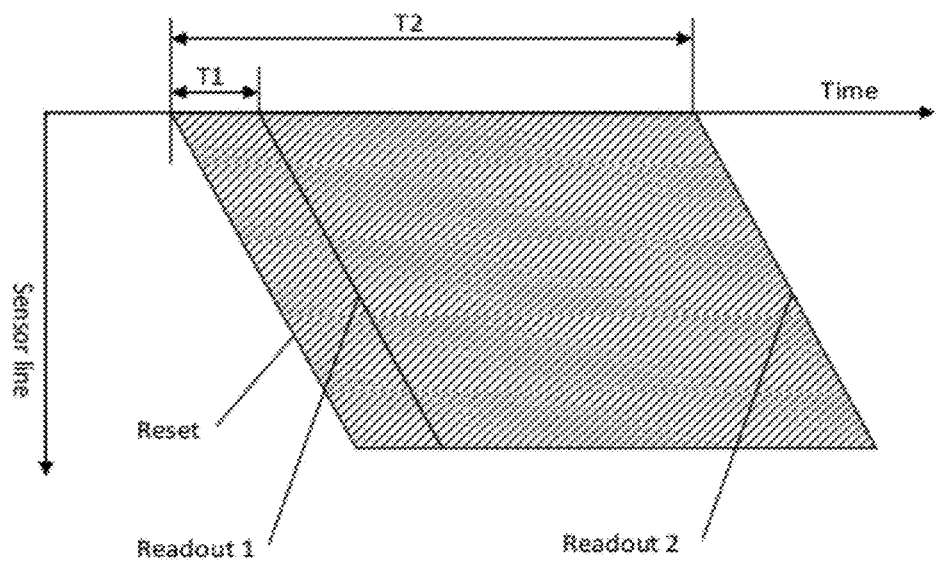
FIG. 1 illustrates the data reading mode which is possible when there is a non-destructive access to sensor pixels.

The reading mode illustrated in FIG. 1 consists of:
initial line-by-line reset of all sensor pixels to their original condition;
exposure during time T1;
line-by-line readout of the image obtained during exposure T1;
additional exposure during time T2-T1;
line-by-line readout of the image obtained during exposure T2.

As a result, two images are produced: the first with the exposure time T1 (let us call it A), the second with the exposure time T2 (let us call it B).

This data readout mode is preferable; however it is only possible when there is non-destructive readout access to the sensor pixels.

Method 2.

Figure 2:
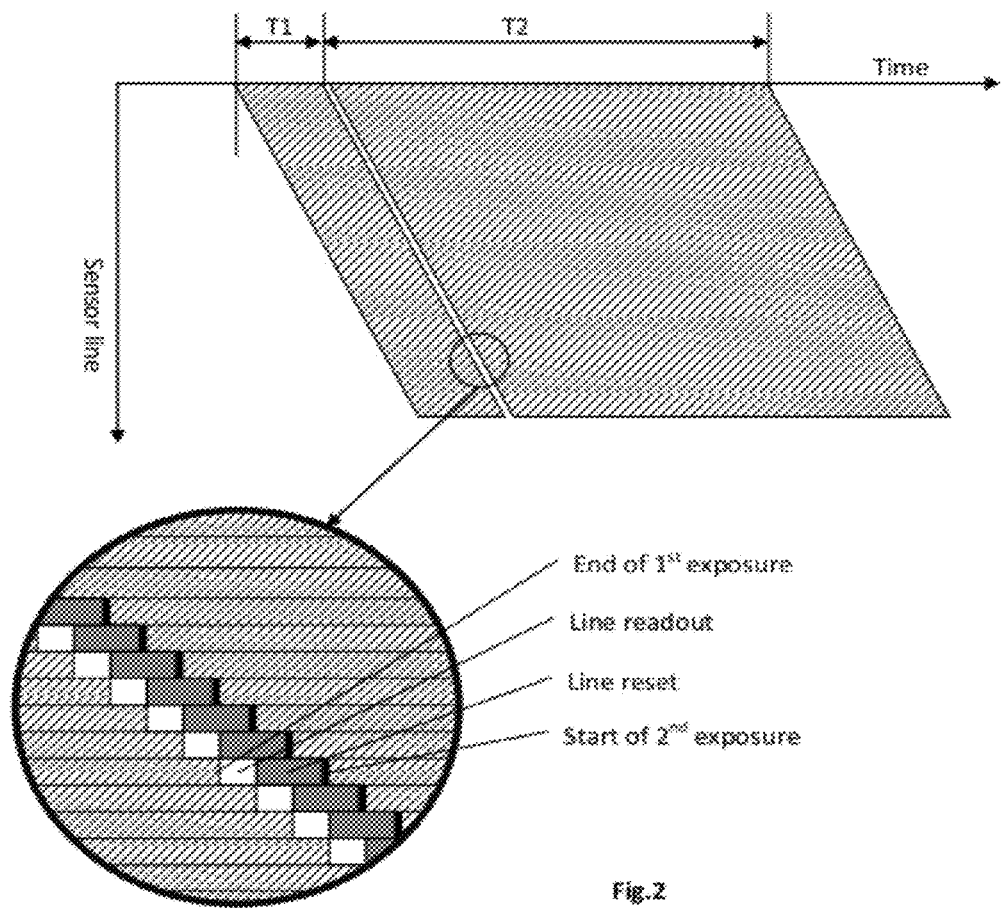
FIG. 2 shows the mode with intermediate sensor reset.
Figure 3:
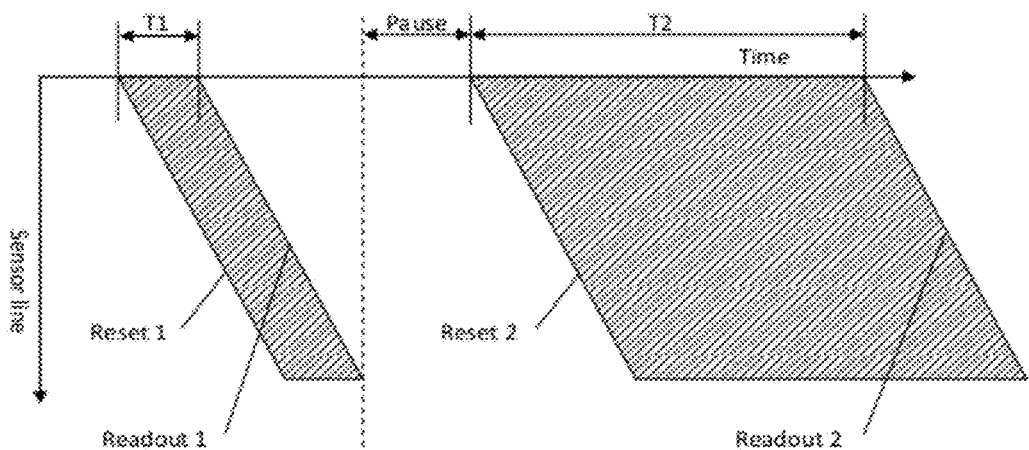
FIG. 3 shows the standard data reading mode.

The data reading mode illustrated in FIG. 2 consists of:
initial line-by-line reset of all sensor pixels to their original condition;
exposure during time T1;
line-by-line destructive readout of the image obtained during exposure T1;
reset of all sensor pixels to their original condition immediately after the readout;
additional exposure during time T2;
line-by-line readout of the image obtained during exposure T2;

This readout method produces images which are similar to those which were obtained by the mode illustrated in FIG. 1 by summing up images obtained during time T1 and T2 into the single image B. Unlike method one, image B is not exposed during the second reset of the cells. However, the time required for such reset is negligibly short compared to times T1 and T2. The optimal result is achieved when the reset time does not exceed 1/20 of the total exposure time.

Images A and B are transferred to the second phase for further processing. When the total time of the exposure plus the time required for resetting the sensor before exposure is negligibly small in comparison with the dynamics of the scene photographed, in order to get the best result several pairs of images are built during the first stage (A1 B1; A2 B2; . . . ), with follow-up selection of the best pair during the second stage.

Properties of images obtained during the first stage:

Images obtained after the first stage have different exposure times. T1<T2, so exposure of image A is shorter than exposure of image B. It was identified that the optimal ratio is T1=T2/5. In other words, the exposure of image A should be five times shorter. With such an exposure time ratio:
signal/noise ratio in image B is five times higher than in image A;
fuzziness (blurriness) of the image (when, for example, the camera is shaking during exposure) in image A is significantly lower than in image B.

Stage Two

Selection of the Best Pair of Images

Once several pairs of images are obtained in the first stage, the best pair must be selected for further processing. The blurriness level in image B has the greatest impact on further processing. The sharper image (B1 or B2 or B . . . ) is selected in the following way:

1. Extraction of the brightness component.

Let us suppose that each pixel in the image is stored in form of three color components: R, G, B. So, the brightness component (Y) is identified by the following formula:

$$Y = R*0.2989 + G*0.587 + B*0.114$$

This interpretation of the signal and calculation method for the brightness component is typical in image processing and well known.

2. Calculation of the sum of squares of the brightness gradient in both images:

$$Gx_{x,y} = Y_{x-1,y-1} - Y_{x+1,y-1} - Y_{x+1,y+1} + 2Y_{x-1,y} - 2Y_{x+1,y}$$

$$Gy_{x,y} = Y_{x-1,y-1} + Y_{x+1,y-1} - Y_{x-1,y+1} - Y_{x+1,y+1} + 2Y_{x,y-1} - 2Y_{x,y+1}$$

$$G = \Sigma_{x,y}(Gx_{x,y}*Gx_{x,y} + Gy_{x,y}*Gy_{x,y})$$

Where:
Gx—gradient component in the x direction,
Gy—gradient component in the y direction,
G—sum of squares of gradient values,
x,y—coordinates of a pixel.

3. The image should have the highest G value.

Once the best pair is identified, there are two images available:
A—the sharper image but with the higher noise level;
B—possibly the fuzzier image but with the lower noise level.

Noise Reduction in Image A (Filtering).

Besides useful data (exposed scene), image A contains spurious noise. Low-noise data in image B can help filter the useful signal from noise in image A. This method is different from known methods of filtering out noise by using a single image because the second image (B) is used to separate noise from useful signal. That helps to separate noise and useful signal to the optimal extent and to leave the useful signal intact.

The filtering procedure can be applied either to the brightness component or to the luminance and chrominance components or to each color channel (R, G, B) individually.

Figure 4:
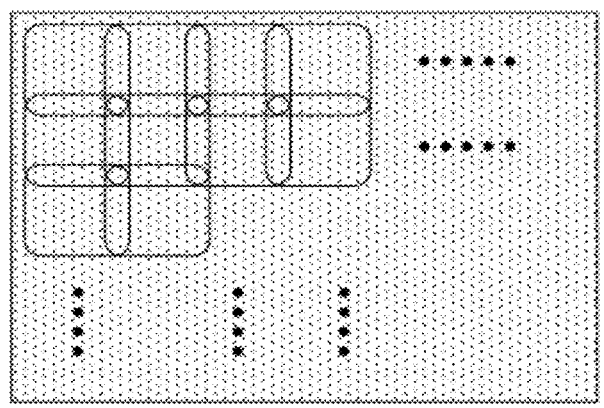
FIG. 4 shows how an image is partitioned during the image filtering process into small overlapping areas of equal size (tiles).
Figure 5:
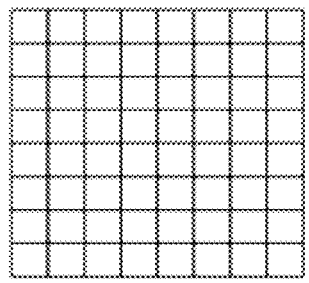
FIG. 5 illustrates the first method of partitioning the coefficients of the two-dimensional frequency transform to the non-overlapping areas.
Figure 6:
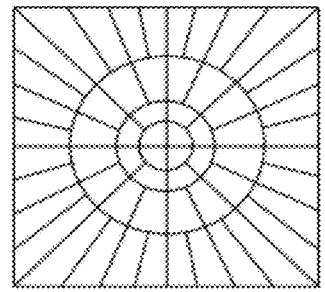
FIG. 6 shows the second method of partitioning the coefficients of the two-dimensional frequency transform to the non-overlapping areas.
Figure 7:
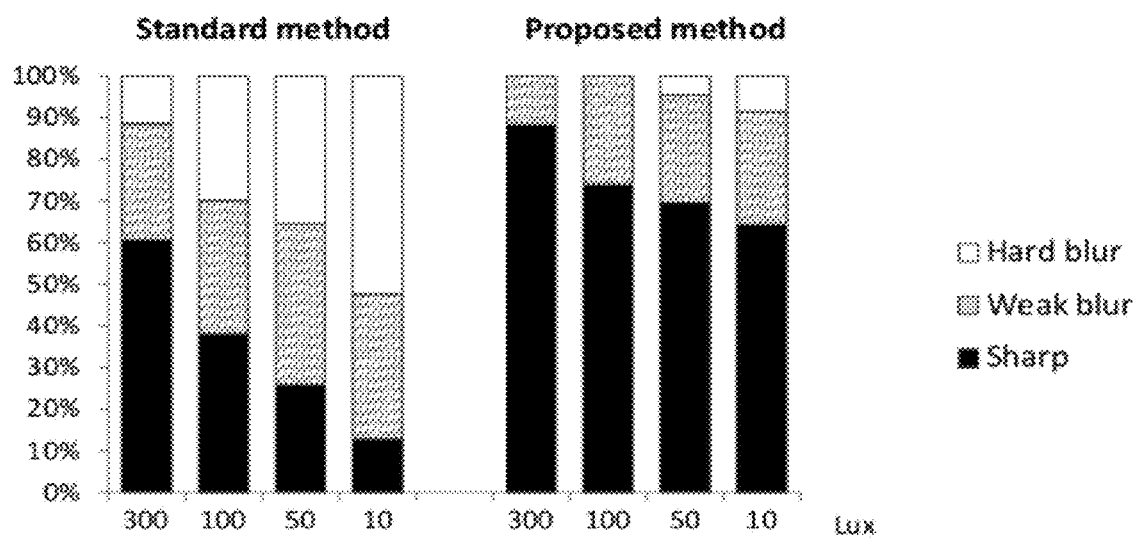
FIG. 7 is a diagram which graphically illustrates the percentage of high-quality images which are obtained by the proposed method in comparison with known methods.

The procedure described below reduces noise in image A with the help of data in image B:
The channel selected for filtering (for example, luminance channel) of images A and B is decomposed into smaller overlapping areas of equal size (tiles). See FIG. 4.
Each of the tiles undergoes the same processing algorithm:
a window is applied to the data of each tile and two-dimensional frequency transform takes place (for example, the 2D Fourier transform). The window is used to reduce Gibbs effects during the frequency conversion. The squared window function must meet the unity signal amplification condition when summed up with the overlaying windows of the neighboring tiles;
the resultant two-dimensional frequency transform coefficients are divided into non-overlapping areas (see FIG. 5; FIG. 6);
coefficients of image A are filtered in each area with the help of coefficients of image B;
inverse frequency transform takes place and windows are applied for the second time.
Corrected image A is built by summing up the resulting overlapping tiles.

With the exception of areas with the lowest frequencies (which do not undergo filtering), the coefficient filtering algorithm for each area is as follows:

Average energy of coefficients of images A and B, their cross-correlation and average adjustment of the energy of coefficients of image B are calculated:

$$\overline{E_A} = \frac{\sum_{i=1}^{N}(C_i^A)^2}{N}$$

$$\overline{E_B} = \frac{\sum_{i=1}^{N}(C_i^B)^2}{N}$$

$$Xcorr = \frac{\sum_{i=1}^{N} C_i^A C_i^B}{N}$$

$$Att_B = \frac{Xcorr}{\overline{E_B}}$$

Amplitude of coefficients of B is adjusted:

$$C_i'^B = C_i^B \cdot Att_B$$

Coefficients of image A of which the squared amplitude is much higher in a given area (for example, three times as high) and adjacent coefficients remain intact.

The amplitude of coefficients of image A in excess of the amplitude of coefficients of image B decreases:

$$C_i'^A = C_i^A \cdot \frac{|C_i'^B|}{|C_i^A|}$$

Such a filtering procedure involving transfer to the frequency domain is optimal because it can help compensate for slight movement of objects in the scene which are usually present in real photographic conditions.

Getting the Final Image

Once noise has been suppressed, image A has two images with different exposure times and low noise levels. However, the image with the longer exposure time may be fuzzy (not sharp). Fusion of these two images into a single image produces the final image with an expanded dynamic range.

Some shadowed areas of image A might not accumulate sufficient charge to display details in the image, in which case image B can be used to fill such areas. Despite the high probability of image B being fuzzy, it may still allow for displaying in the final image some shadowed details of the scene.

Fusion of images occurs as described in the literature ("Exposure Fusion", Tom Mertens, Jan Kautz and Frank Van Reeth. In "Proceedings of Pacific Graphics, 2007") allowing for getting the final image without the need to use intermediate HDR representation. In this process, each incoming image undergoes pyramidal decomposition and each level of the decomposition involves a simple summing of images with weights identified by the function which assigns weights based on proximity of the exposure of a given area of an image to the optimal exposure.

INDUSTRIAL APPLICABILITY

The proposed invention makes it possible to get high-quality images through the use of devices with sensors with an electronic shutter which enable the use of a special exposure mode as described above. Today an electronic shutter is used in most cellular phones with built-in cameras. This invention can be used on cameras with mechanical shutters as well, but the quality of images will not be as high. It is noteworthy that the proposed solution can be used in combination with image stabilizers. In this case, the technologies harmonically supplement one another and allow for expanding the exposure range that can produce a sharp image. The proposed solution does not require modification of the design of the sensor.

What is claimed is:

1. An image enhancement method comprising:
   (a) obtaining a plurality exposures with a low signal/noise ratio,
   (b) identification of original images with the best sharpness from these exposures, and
   (c) making the final image with a high signal/noise ratio and high definition, by filtering the images with shorter exposure times by using data from the images with longer exposure times.

2. An image enhancement method as claimed in claim 1, wherein original images are taken from groups of exposures one after another where exposures from the same group either partially overlap in time or the interval between them does not exceed 1/20 of the total time of the exposure.

3. An image enhancement method as claimed in claim 1, wherein the final image is built through fusion of original images from the same group with different exposure times.

* * * * *